(12) United States Patent
Li

(10) Patent No.: US 10,855,572 B2
(45) Date of Patent: Dec. 1, 2020

(54) AREA ABSTRACTION EXTENSIONS TO ROUTING PROTOCOLS

(71) Applicant: Arista Networks, Inc., Santa Clara, CA (US)

(72) Inventor: Anthony Joseph Li, Los Altos, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/013,497

(22) Filed: Jun. 20, 2018

(65) Prior Publication Data

US 2019/0394115 A1 Dec. 26, 2019

(51) Int. Cl.
*H04L 12/751* (2013.01)
*H04L 12/24* (2006.01)
*H04L 12/715* (2013.01)

(52) U.S. Cl.
CPC .......... *H04L 45/02* (2013.01); *H04L 41/0893* (2013.01); *H04L 45/04* (2013.01); *H04L 45/46* (2013.01)

(58) Field of Classification Search
CPC ..... H04L 45/02; H04L 45/04; H04L 41/0893; H04L 45/46; H04L 45/34
See application file for complete search history.

(56) References Cited

U.S. PATENT DOCUMENTS

| 7,177,951 | B1 | 2/2007 | Dykeman et al. |
| 7,281,057 | B2 * | 10/2007 | Cain ..................... H04L 45/00 370/351 |
| 8,214,447 | B2 | 7/2012 | Deslippe et al. |
| 8,995,303 | B1 | 3/2015 | Brar et al. |
| 9,253,663 | B2 | 2/2016 | Raleigh et al. |
| 9,491,089 | B2 | 11/2016 | Bhatt et al. |
| 9,584,363 | B1 | 2/2017 | Olson |

(Continued)

OTHER PUBLICATIONS

C. Filsfils et al.; "Segment Routing Architecture, draft-ietf-spring-segment-routing-13" Oct. 2017; https://tools.ietf.org/id/draft-ietf-spring-segment-routing-13.html.

(Continued)

*Primary Examiner* — Asad M Nawaz
*Assistant Examiner* — Kai Chang
(74) *Attorney, Agent, or Firm* — Chamberlain, Hrdlicka, White, Williams & Aughtry

(57) ABSTRACT

Embodiments of the invention may relate to a method for routing protocol area abstraction. The method may include electing an area leader from among network devices; generating, by the area leader, an area representation node identifier associated with the first area; distributing, by the area leader, the area representation node identifier to area edge devices; receiving, from the area edge devices, second area link state packets (LSPs); generating, by the area leader and using the second area LSPs, an area representation node LSP that includes the area representation node identifier and area neighbor adjacencies; and distributing, by the area leader, the area representation node LSP to a plurality of network devices in a second area of the network. In response to receiving a copy of the area representation node LSP, each of the network devices in the second area may advertise an adjacency to an area representation node.

20 Claims, 4 Drawing Sheets

(56) References Cited

U.S. PATENT DOCUMENTS

| | | | |
|---|---|---|---|
| 9,674,193 | B1 | 6/2017 | Madasamy |
| 9,712,390 | B2 | 7/2017 | Lissack |
| 9,760,598 | B1 | 9/2017 | Holenstein et al. |
| 9,984,140 | B1 | 5/2018 | Sukumaran et al. |
| 10,218,610 | B2* | 2/2019 | Frost ............... H04L 45/50 |
| 10,469,360 | B1* | 11/2019 | Bhat ................ H04L 45/06 |
| 2004/0143425 | A1 | 7/2004 | Rosenberg |
| 2005/0265260 | A1 | 12/2005 | Zinin et al. |
| 2007/0124375 | A1 | 5/2007 | Vasudevan et al. |
| 2007/0280102 | A1* | 12/2007 | Vasseur ............... H04J 3/14 370/225 |
| 2009/0144443 | A1* | 6/2009 | Vasseur ............... H04L 45/02 709/238 |
| 2009/0245137 | A1* | 10/2009 | Hares ................ H04L 41/30 370/254 |
| 2010/0057563 | A1 | 3/2010 | Rauber et al. |
| 2010/0296414 | A1 | 11/2010 | Vohra et al. |
| 2011/0103228 | A1 | 5/2011 | Sheth et al. |
| 2013/0077621 | A1* | 3/2013 | Jacob Da Silva ...... H04L 45/58 370/355 |
| 2013/0145461 | A1 | 6/2013 | Barton' et al. |
| 2013/0311229 | A1 | 11/2013 | Hadar et al. |
| 2014/0269421 | A1 | 9/2014 | Previdi et al. |
| 2014/0269725 | A1* | 9/2014 | Filsfils ................ H04L 45/46 370/392 |
| 2015/0127789 | A1 | 5/2015 | Lissack |
| 2016/0027292 | A1 | 1/2016 | Kerning |
| 2016/0094398 | A1 | 3/2016 | Choudhury et al. |
| 2016/0134482 | A1 | 5/2016 | Beshai |
| 2016/0248658 | A1* | 8/2016 | Patel ................ H04L 45/127 |
| 2017/0353360 | A1* | 12/2017 | Hayashitani ......... H04L 43/103 |
| 2018/0041360 | A1 | 2/2018 | Shen et al. |
| 2018/0176082 | A1* | 6/2018 | Katz ................ G06F 9/54 |
| 2018/0176093 | A1* | 6/2018 | Katz ................ G06F 9/5061 |

OTHER PUBLICATIONS

T. Li; "Dynamic Flooding on Dense Graphs, draft-li-dynamic-flooding-04"; Mar. 2018; https://tools.ietf.org/html/draft-li-dynamic-flooding-04.

"Information technology—Telecommunications and information exchange between systems—Intermediate System to Intermediate System intra-domain routeing information exchange protocol for use in conjunction with the protocol for providing the connectionless-mode network service (ISO 8473)"; ISO/IEC 10589:2002(E); 2002.

International Search Report issued in corresponding Application No. PCT/US2019/037815, dated Jul. 26, 2019.

N. Shen et al.; "IS-IS Routing for Spine-Leaf Topology"; Internet Draft, Networking Working Group; Jan. 2, 2018; XP015124979.

T. Li, Arista Networks; "Dynamic Flooding for IS-IS"; Internet Draft, Internet Engineering Task Force; Jan. 7, 2018; XP015125062.

Written Opinion issued in corresponding Application No. PCT/US2019/037815, dated Jul. 26, 2019.

J. Moy; "OSPF Version 2"; STD 54, RFC 2328; DOI 10.17487/RFC2328, Apr. 1998; https://tools.ietf.org/html/rfc2328.

R. Coltun et al.; "OSPF for IPv6"; RFC 5340; DOI 10.17487/RFC5340, Jul. 2008; https://tools.ietf.org/html/rfc5340.

* cited by examiner

AREA ABSTRACTION EXTENSIONS TO ROUTING PROTOCOLS

BACKGROUND

Networks of interconnected devices (e.g., computer networks) often include any number of network devices. Such network devices may be arranged in a network topology in order to provide connectivity between devices within and outside of the network. Within such network topologies, routing protocols are often implemented that distribute certain information (e.g., network topology information) related to routing network traffic data units (e.g., packets, frames, etc.) within and/or through the network. Such information may be stored in relevant databases (e.g., link state databases) on the network devices. Inclusion of the information describing the entire network topology, or a substantial portion thereof, in such databases may reduce performance of the network, or any devices therein, as the amount of stored routing-related information increases.

SUMMARY

In general, in one aspect, embodiments of the invention may relate to a method for routing protocol area abstraction. In one or more embodiments of the invention, the method includes electing an area leader from among network devices in a network; generating, by the area leader, an area representation node identifier associated with the first area; distributing, by the area leader, the area representation node identifier to area edge devices; receiving, from the area edge devices, second area link state packets (LSPs); generating, by the area leader and using the second area LSPs, an area representation node LSP that includes the area representation node identifier and area neighbor adjacencies; and distributing, by the area leader, the area representation node LSP to a plurality of network devices in a second area of the network. In one or more embodiments of the invention, in response to receiving a copy of the area representation node LSP, each of the plurality of network devices in the second area advertise an adjacency to an area representation node.

In general, in one aspect, embodiments of the invention relate to a non-transitory computer readable medium that includes instructions which, when executed by a processor, perform a method for routing protocol area abstraction. In one or more embodiments of the invention, the method performed via execution of the instructions includes electing an area leader from among a network devices in a network; generating, by the area leader, an area representation node identifier associated with the first area; distributing, by the area leader, the area representation node identifier to area edge devices; receiving, from the area edge devices, second area link state packets (LSPs); generating, by the area leader and using the second area LSPs, an area representation node LSP that includes the area representation node identifier and area neighbor adjacencies; and distributing, by the area leader, the area representation node LSP to network devices in a second area of the network. In one or more embodiments of the invention, in response to receiving a copy of the area representation node LSP, each of the plurality of network devices in the second area advertise an adjacency to an area representation node.

In general, in one aspect, embodiments of the invention relate to a system for routing protocol area abstraction. In one or more embodiments of the invention, the system includes an elected area leader. In one or more embodiments of the invention, the elected area leader includes a processor, a memory, and a storage device, and is operatively connected to area edge devices, network devices of a first area of a network, and network devices of a second area of a network. In one or more embodiments of the invention, the elected area leader is configured to generate an area representation node identifier associated with the first area; distribute the area representation node identifier to the area edge devices; receive, from the area edge devices, second area link state packets (LSPs); generate, using the plurality of second area LSPs, an area representation node LSP that includes the area representation node identifier and area neighbor adjacencies; and distribute the area representation node LSP to the network devices of the second area. In one or more embodiments of the invention, in response to receiving a copy of the area representation node LSP, each of the network devices in the second area advertise an adjacency to an area representation node.

DETAILED DESCRIPTION

Figure 1:
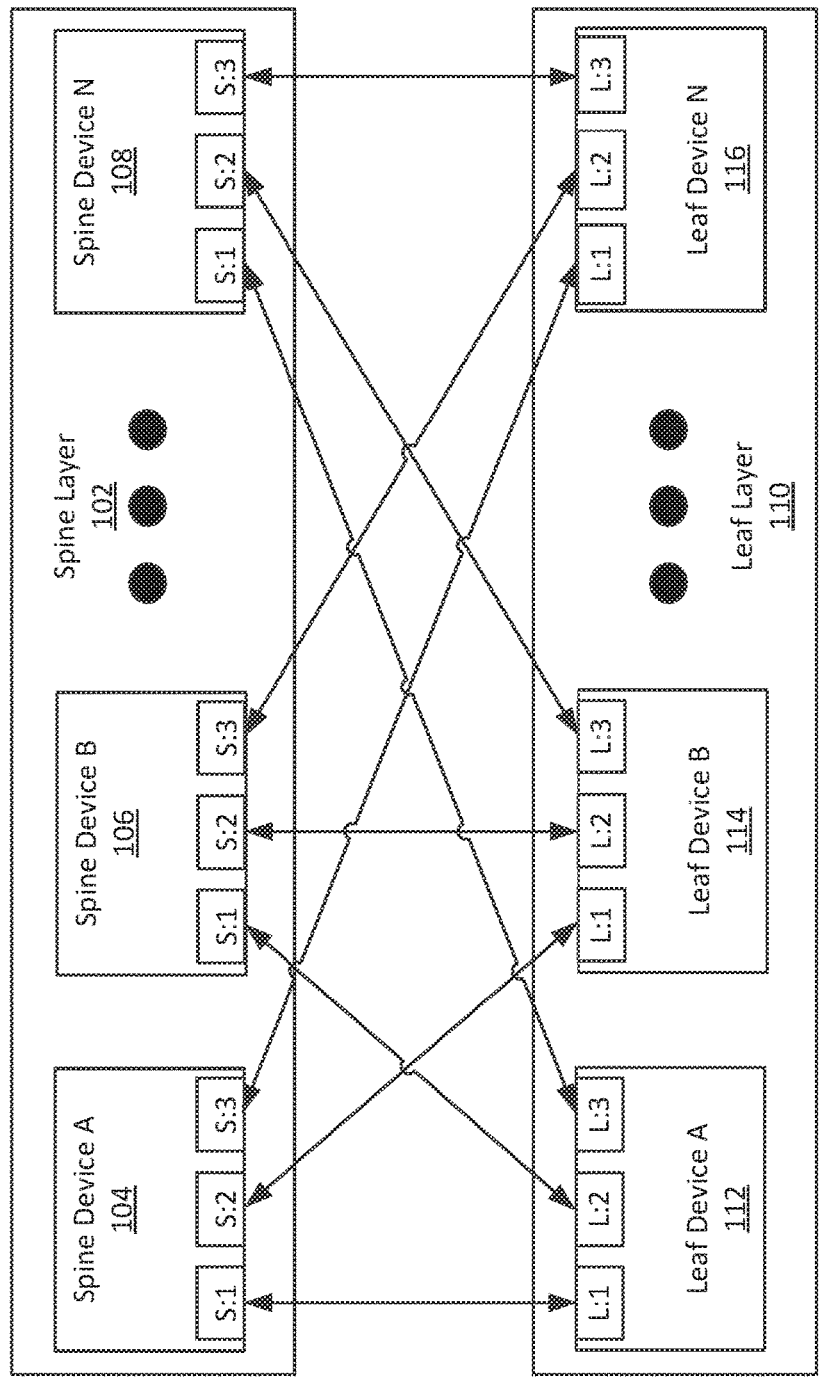
FIG. 1 shows a network topology in accordance with one or more embodiments of the invention.

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to abstraction of an area within a network implementing a link state routing protocol. Specifically, in one or more embodiments of the invention, an area is abstracted to provide for routing using network devices within a first area, without having to include the entire topology of the first area in link state databases of network devices in a second area operatively connected to one or more network devices in the first area. More specifically, in one or more embodiments of the invention, a first area is abstracted as an area representation node with adjacency to network devices in a second area.

In one or more embodiments of the invention, the network devices of the second area advertise adjacency to the area representation node rather than to any specific network devices within the topology of the first area represented by the area representation node. Thus, it may appear, according to the link state databases of network devices in the second area, that a network traffic data unit (e.g., frame, packet, etc.) that is received at a first network device in the second area that is to be routed to a second network device in the second area may simply be routed to the second network device via the area representation node. In this way, the actual topology of the first area and the network devices therein need not be included in the link state databases of the network devices in the second area, which may reduce the storage burden in such link state databases. In one or more embodiments of the invention, a network traffic data unit may actually be routed through devices in the first area (i.e., the area represented by the area representation node) by area edge devices (i.e., network devices operatively connected to both the first and second areas) using segment routing.

Although the various embodiments of the invention discussed below are described in the context of a first and a second area of a network, one having ordinary skill in the art will appreciate that embodiments of the invention apply to networks with any number of areas (e.g., more than two areas), and that, in such networks, any one or more areas may be represented in any link state database of other areas as an area representation node (e.g., there may be a hierarchy of area abstractions). For example, there may be a third area that subsumes both the first and second area, where the internal topology details of the first area are not exposed to the link state database of the third area. Said another way, the area abstraction may hide topology details from both adjacent areas as well as subsuming areas.

FIG. 1 shows a network topology in accordance with one or more embodiments of the invention. As shown in FIG. 1, the network topology (100) includes a spine layer (102) and a leaf layer (110). The spine layer (102) may include any number of spine devices, such as spine device A (104), spine device B (106), and spine device N (108). The leaf layer (110) may include any number of leaf devices, such as leaf device A (112), leaf device B (114), and leaf device N (116). Each of these components is described below.

In one or more embodiments of the invention, a network topology (100) is an arrangement of various elements of a network. In one or more embodiments of the invention, a network includes a collection of one or more network devices (e.g., spine devices (104, 106, 108), leaf devices (112, 114, 116)) that facilitate network connectivity for one or more operatively connected devices (e.g., computing devices, data storage devices, other network devices, etc.). As used herein, the term operatively connected, or operative connection, means that there exists between elements/components a direct or indirect connection that allows the elements to interact with one another in some way. For example, such elements may exchange information, send instructions to perform actions, cause changes in state and/or operating condition, etc. Additionally, as used herein, a network may be an entire network or any portion thereof (e.g., a logical portion of network devices within the network topology, external to the network topology, etc.). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments of the invention, the network topology (100) is a bipartite network topology. In one or more embodiments of the invention, a bipartite network topology is a network topology in which there are at least two sets of network devices, with connections between devices of one set and devices of another set, but no connections between devices within a given set. Examples of such network topologies include, but are not limited to, a folded three-stage Clos network topology (e.g., a spine-leaf network topology), a fat tree topology (i.e., Leiserson topology), etc. In one or more embodiments of the invention, a network topology may include network devices that are highly interconnected, with, as an example, each device in a first set of network devices being connected to each device in a second set of network devices within the network topology. In the exemplary embodiment shown in FIG. 1, the network topology (100) is a spine-leaf topology. Although FIG. 1 shows an example of a spine-leaf topology, in one or more embodiments of the invention, the network topology is not limited to being a spine-leaf topology (or the particular example shown), or any other example of a network topology set forth herein.

In one or more embodiments of the invention, when a network topology (100) is arranged as a spine-leaf topology, the network topology (100) includes a leaf layer (110) and a spine layer (102).

In one or more embodiments of the invention, a leaf layer (110) is a set of any number of network devices (e.g., leaf devices (112, 114, 116)) that provide network connectivity to any number of attached devices (not shown), such as, for example, computing devices. In one or more embodiments of the invention, a computing device is any device or any set of devices capable of electronically processing instructions and that includes, at least, one or more processors, memory, input and output device(s), and network connectivity via a leaf layer (110). Examples of computing devices include, but are not limited to, a server (e.g., a blade-server in a blade-server chassis, a rack server in a rack, etc.), a virtual machine (VM), a desktop computer, a mobile device (e.g., laptop computer, smart phone, personal digital assistant, tablet computer, and/or any other mobile computing device), and/ or any other type of computing device with the aforementioned requirements. Other examples of devices for which a leaf layer (110) may provide network connectivity include, but are not limited to, data storage devices (not shown), other network devices (e.g., wireless routers) (not shown), media devices (e.g., televisions) (not shown), etc.

In one or more embodiments of the invention, a spine layer (102) is a set of any number of network devices (e.g., spine devices (104, 106, 108)) that provide, at least, network connectivity between network devices of a leaf layer (110). In one or more embodiments of the invention, each leaf device (112, 114, 116) within a leaf layer (102) is operatively connected to each spine device (104, 106, 108) within a spine layer (102), and each spine device (104, 106, 108) within a spine layer is operatively connected to each leaf device (112, 114, 116) within a leaf layer (102).

In one or more embodiments of the invention, each leaf device (112, 114, 116) and each spine device (104, 106, 108) is a network device. In one or more embodiments of the invention, a network device may be a physical device that includes and/or may operatively connected to persistent storage (not shown), memory (e.g., random access memory (RAM)) (not shown), one or more processor(s) (e.g., integrated circuits) (not shown), and two or more physical network interfaces (which may also be referred to as ports).

As shown in FIG. 1, examples of such interfaces include ports S:1, S:2, and S:3 on each spine device (104, 106, 108) and ports L:1, L:2, and L:3 on each leaf device (112, 114, 116). Although not shown in FIG. 1, leaf devices (112, 114, 116) and/or spine devices (104, 106, 108) may have any number of additional ports for connecting to any number of other devices. In one or more embodiments of the invention, the one or more processors of a network device (e.g., a central processing unit) are separate components from a network chip, one or more of which may also be components of a network device.

In one or more embodiments of the invention, the network device also includes any number of network chips. In one or more embodiments of the invention, a network chip is any hardware (e.g., circuitry), software, firmware, and/or combination thereof that includes functionality to receive, process, and/or transmit network traffic data units in accordance with one or more embodiments of the invention. In order to perform such functionality, a network chip may include any number of components. Such components may include, but are not limited to, one or more processors, one or more buffers (e.g., for implementing receive and/or transmit queues, such as virtual output queues (VOQs)), any type or amount of non-volatile storage, and/or any type or amount of volatile storage (e.g., RAM). A network chip may also include and/or be operatively connected to any number of physical network interfaces (e.g., L:1, L:2, L:3, S:1, S:2, or S:3 as shown in FIG. 1) of a network device. Such interfaces may provide a path external to the network device (e.g., to other devices), and/or may be operatively connected to other components internal to the network device (100), and each such interface may be an ingress and/or egress interface.

In one or more embodiments of the invention, a network device includes functionality to receive network traffic data units (e.g., frames, packets, etc.) at any of the physical network interfaces (i.e., ports) of the network device and to process the network traffic data units to determine whether to: (i) drop the network traffic data unit; (ii) process the network traffic data unit; and/or (iii) transmit the network traffic data unit, based on the processing, from a physical network interface or port on the network device in accordance with one or more embodiments of the invention.

As a non-limiting example, a network chip may be hardware that receives network traffic data units at an ingress port, and determines out of which egress port on the network device (100) to forward the network traffic data units such as, for example, media access control (MAC) frames that may include Internet Protocol (IP) packets.

In one or more embodiments of the invention, a network device (e.g., leaf devices (112, 114, 116), spine devices (104, 106, 108)) may include functionality to store (e.g., in persistent storage, in memory, etc.), any number of data structures for facilitating operation of at least some aspects of the network device. An example of such a data structure is a link state database (not shown). Any network device described herein may include any number of link state databases.

In one or more embodiments of the invention, a link state database is a data repository for storing link state information received from neighboring network devices via the ports of a network device. In one or more embodiments of the invention, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the network device data repository (110) includes all or any portion of the persistent and/or non-persistent storage of the network device (100) as described above.

In one or more embodiments of the invention, network devices within a network topology (100) (or a portion thereof (e.g., a logical area within the topology)) share link state information using any of a variety of types data units (e.g., packets, frames, messages, advertisements, etc.), which may be referred to herein as link state packets (LSPs). Such LSPs may be sent from one network device to directly connected adjacent network devices, and may include information related to the state of links between the sending network device and other devices to which the sending network device is operatively connected.

When a LSP that includes link state information is received at a network device from an adjacent network device, the receiving network device may store the information in at least one of its link state databases and, in turn, propagate the LSP to its own adjacent network devices. Such sharing of link state information between network devices may occur within a network topology implementing an interior gateway protocol (IGP). Examples of an IGP include, but are not limited to, intermediate system to intermediate system (IS-IS) and open shortest path first (OSPF), each of which may be referred to as a type of IGP known as a link state routing protocol.

In one or more embodiments of the invention, when a link-state routing protocol is implemented within a given network topology (or any portion therein), each device participating in the link-state routing topology receives, directly or indirectly, link state information from other devices in the network topology, or logical area within the network topology. In one or more embodiments of the invention, each network device uses the received information to build a mapping of the connectivity of network devices within the topology and/or logical area. Information relating to the mapping may be stored in a link state database.

A network device with a complete mapping of the connectivity of network devices within a topology or logical area may then use any scheme (e.g., the Dijkstra algorithm, segment routing, etc.) to determine a path (e.g., shortest path, path with the least cost, etc.) from itself to other network devices in the network topology or logical area, and such information may be stored in the link state database and/or used to program other portions of the network device (e.g., a routing information base) with information to be used, for example, when processing a received network traffic data unit. In one or more embodiments of the invention, the map of connectivity should be the same on each network device in a topology or logical area, unless one or more network devices have a change in information related to the state of one or more links. Accordingly, once a mapping has been determined, link state information may be sent from a given network device only when a change to link state information of any link of a network device occurs.

A non-limiting example of a scheme for determining a path through a logical area may be referred to as segment routing. In one or more embodiments of the invention, segment routing is a form of source routing, which is a routing scheme by which a sending (i.e., source) device specifies the route that a network traffic data unit takes through a network (or logical area) to a destination device. To achieve the routing to the destination, a network device implementing segment routing may encapsulate a received network traffic data unit and any number of headers (e.g., IP packet headers, MAC frame headers, VXLAN headers, etc.) using any number of additional headers (e.g., labels) that specify to a next-hop device what to do when upon receipt of the encapsulated network traffic data unit. For example, a first next-hop may be instructed to send the encapsulated network traffic data unit to a second next-hop. Accordingly, the first next-hop may remove (e.g., pop off) the label that includes instructions for the first next-hop, and then propagate the remainder of the encapsulated network traffic data unit to the second next-hop device. The process may be repeated until all added segment labels have been removed, and which point the network traffic data unit may be processed by the destination device (e.g., because it has been received by a final destination, because it must be further propagated towards a final destination device, etc.).

As discussed above, link state routing protocols may organize a network into logical areas. For example, in the IS-IS protocol, a network may be organized into a level 1 (L1) area, used for intra-network routing, and a level 2 (L2) area, used for inter-network routing. Additionally, a network implementing IS-IS may also include any number of network devices that are connected to both L1 devices and L2 devices. Said another way, some devices may be referred to as participating in both L1 and L2, and thus be L1/L2 devices. Devices participating on more than one logical area (in any link state routing protocol) may be referred to herein as area edge devices. In one or more embodiments of the invention, devices in a spine layer (102) may be grouped into a first area (e.g., an IS-IS level 1 area), and devices in a leaf layer (110) may be grouped into a second area (e.g., an IS-IS level 2 area), with any number of area edge devices participating in both the first area and the second area, each of which may be either leaf or spine devices. Network areas and area edge devices are discussed further in the description of FIG. 2, below.

In one or more embodiments of the invention, a network device also includes software and/or firmware stored in any network device storage (not shown) and/or network device memory (not shown) (i.e., non-transitory computer readable mediums). Such software may include instructions which, when executed by the one or more processors (not shown) of the network device, cause the one or more processors to perform operations in accordance with one or more embodiments of the invention. The software instructions may be in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to embodiments of the invention. The functionality of a network device is not limited to the aforementioned examples.

Examples of a network device include, but are not limited to, a network switch, a router, a multilayer switch, a fibre channel device, an InfiniBand® device, etc. A network device is not limited to the aforementioned specific examples.

While FIG. 1 shows a configuration of components, other configurations may be used without departing from the scope of the invention. For example, the network topology may be any network topology other than the spine-leaf topology shown in FIG. 1. As another example, the quantity of network devices in the spine layer may be less (or more) than the quantity of network devices in the leaf layer. As another example, each leaf device and each spine device may have any number of additional ports for connecting to any number of other devices, or that may not be connected to any other device at a given time. Accordingly, embodiments disclosed herein should not be limited to the configuration of components shown in FIG. 1.

Figure 2:
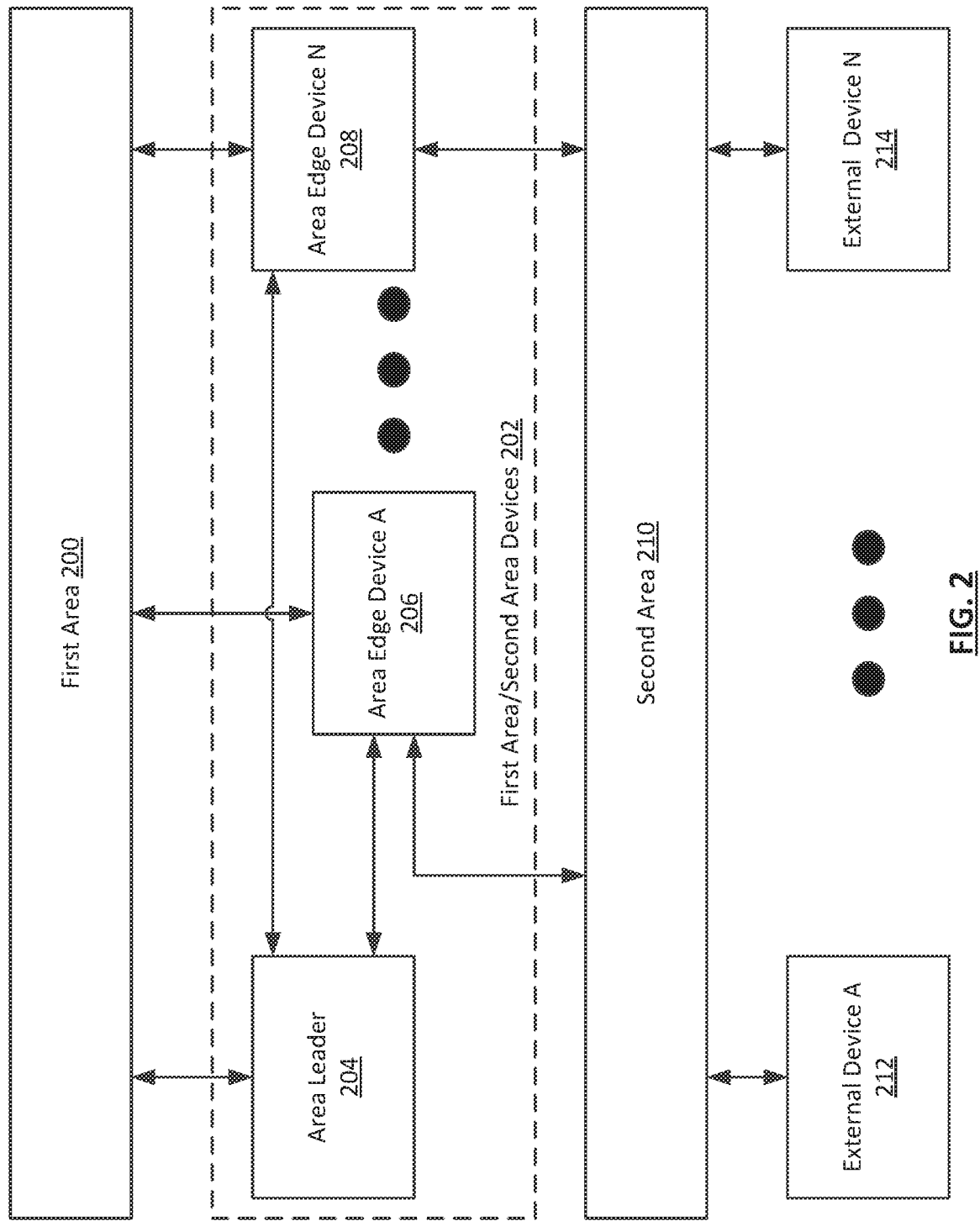
FIG. 2 shows a system in accordance with one or more embodiments of the invention.

FIG. 2 shows a network implementing a link state protocol that divides the network into two areas in accordance with one or more embodiments of the invention. As shown in FIG. 2, the network includes a first area (200), a second area (202), and any number of first area/second area devices (202). Such first area/second area devices (202) may include, but are not limited to, an area leader (204), and any number of area edge devices, such as area edge device A (206) and area edge device N (208). Additionally, the network may include and/or be operatively connected, via the second area, to any number of external devices, such as external device A (212) and external device N (214). Each of these components is described below.

In one or more embodiments of the invention, the first area (200) is a logical area of a network topology that includes any number of interconnected network devices (not shown) for facilitating intra-network topology routing. For example, the first area (200) may be the L1 area of a network topology implementing the IS-IS link state routing protocol. As another example, the first area may be the backbone area (i.e., area 0) of a network topology implementing the OSPF link state routing protocol. In one or more embodiments of the invention, the network devices in the first area (200) are network devices included in a spine layer of a network topology (e.g., spine layer (102) of FIG. 1), and, as such, may provide network connectivity between any number of network devices included in a second area (210) (discussed below). In one or more embodiments of the invention, network devices in the first area (200) are operatively connected to, at least, any number of devices in a second area (210) and any number of devices that participate in both the first area (200) and the second area (210), such as first area/second area devices (202) (discussed below).

In one or more embodiments of the invention, the second area (210) is a logical area of a network topology that includes any number of interconnected network devices (not shown) for facilitating routing of network traffic data units that may be received from and/or sent to devices that are outside the second area and/or the network topology that includes the first area (200) and the second area (210). For example, the second area (210) may be the L2 area of a network topology implementing the IS-IS link state routing protocol. As another example, the first area may be any non-backbone area (i.e., any area other than area 0) of a network topology implementing the OSPF link state routing protocol.

In one or more embodiments of the invention, the network devices in the second area (210) are network devices included in a leaf layer of a network topology (e.g., spine layer (110) of FIG. 1), and, as such, may provide network connectivity for any connected devices (e.g., computing devices, other network devices, etc.). In one or more embodiments of the invention, network devices in the second area (210) are operatively connected to, at least, any number of devices in a first area (200) and any number of devices that participate in both the first area (200) and the second area (210), such as first area/second area devices (202) (discussed below).

In one or more embodiments of the invention, any number of external devices (e.g., external device A (212), external device N (214)) may be operatively connected to the second area. In one or more embodiments of the invention, an external device is any device that may be considered external to the network topology that includes the first area (200) and the second area (210). For example, an external device (212, 214) may be a rack server that is directly connected to a top-of-rack switch that is in the second area (210). As another example, an external device may be a top-of-rack switch that is connected to another network device that is within the second area (210). As another example, an external device (212, 214) may be a mobile computing device that is operatively connected to a network device in the second area (210) via, at least in part, the Internet.

In one or more embodiments of the invention, any number of devices may be first area/second area devices (202). As shown in FIG. 2, the dashed line box labeled as first area/second area devices (202) may not actually be a separate area within a network topology implementing a link state routing protocol, but is included merely to show that such devices may exist. In one or more embodiments of the invention, first area/second area devices (202) are any network devices that are configured to participate, at least in part, in both the first area (200) and the second area (200) of the network topology. As such, first area/second area devices (202) may be leaf devices or spine devices within a spine-leaf network topology.

One example of a first area/second area device is an area edge device (e.g., area edge device A (206), area edge device N (208)). In one or more embodiments of the invention, an area edge device (206, 208) is any network device in a network topology that is part of the first area (200) and has at least one connection to a device in the second area (210) that is not also in the first area (200) (e.g., a second area only device). In one or more embodiments of the invention, an area edge device (206, 208) includes a first area link state database (not shown) and a second area link state database (not shown). In one or more embodiments of the invention, an area edge device (206, 208) includes functionality to share first area LSPs with first area devices, and second area LSPs with second area devices, and may populate its link state databases using such LSPs received from other devices in the respective areas. In one or more embodiments of the invention, each area edge device (206, 208) may receive, directly or indirectly, an area representation node identifier originating from an area leader (204) that is populated into the first area link state database of the area edge device. Additionally, in one or more embodiments of the invention, each area edge device (206, 208) maintains a second area adjacency with the area leader (204), either via a direct connection, or via a tunnel implemented using any tunneling protocol.

Another example of a first area/second area device is an area leader (204). In one or more embodiments of the invention, an area leader (204) is a network device elected using any scheme for electing a leader within a network topology or logical area of a network topology. In one or more embodiments of the invention, an area leader (204) has a second area adjacency with any number of area edge devices (206, 208), and is operatively connected to any number of second area devices. In one or more embodiments of the invention, an area leader (204) is any network device elected to represent the first area (200) by aggregating information from second area LSPs received from area edge devices (206, 208), constructing an area representation node LSP using such information, and distributing the area representation node LSP to network devices in the second area, thereby injecting connectivity information relating to the area representation node into the second area link state database of devices in the second area (210). Election of the area leader (204), as well as construction and distribution of the area representation node LSP, are discussed further in the description of FIG. 3, below.

While FIG. 2 shows a configuration of components, other configurations may be used without departing from the scope of the invention. For example, as discussed above, there may be any number of devices in the first area and/or the second area, any number of first area/second area devices, any number of additional areas, and any number of external devices operatively connected to second area devices. Accordingly, embodiments disclosed herein should not be limited to the configuration of components shown in FIG. 2.

Figure 3:
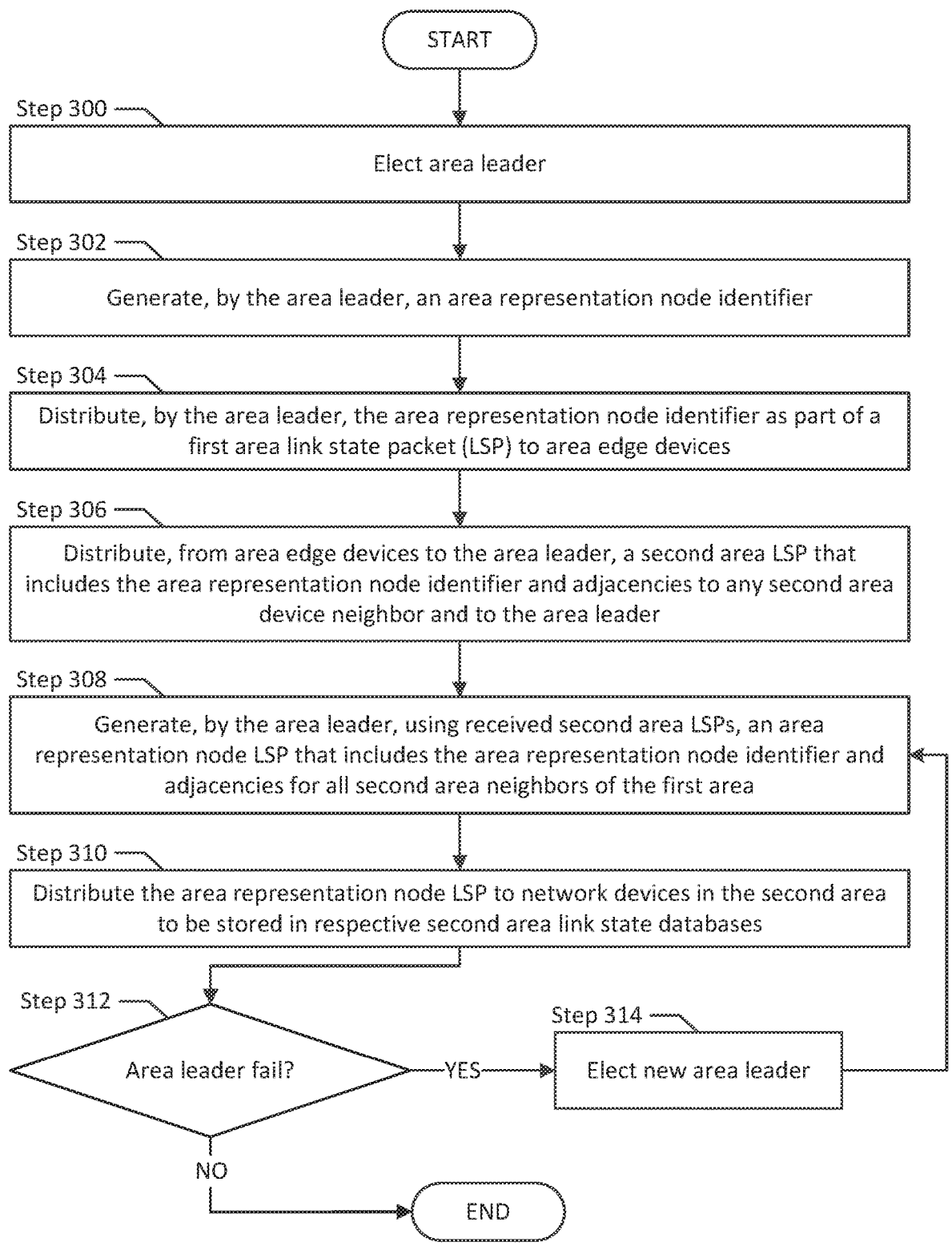
FIG. 3 shows a flowchart in accordance with one or more embodiments of the invention.

FIG. 3 shows a flowchart describing a method for abstracting an area within a network implementing a link state routing protocol in accordance with one or more embodiments of the invention.

In Step 300, once one or more link state databases, including connectivity information within one or more logical areas, has been built on each network device in a network topology (i.e., an initial convergence has occurred), an area leader is elected from among the network devices. In one or more embodiments of the invention, the area leader election may occur using any scheme for electing a single network device from among the network devices in a network topology or logical area of a network topology. Such schemes may include any manner of indicating a leader priority, which may be any identifier capable of indicating a relative priority level from among a group of network devices and related to which device should be an area leader network device.

As an example, each network device may advertise a leader priority, and the network device with the numerically highest leader priority may be elected as the area leader. In one or more embodiments of the invention, if more than one network device advertises the same highest leader priority, an election between such devices may be made using any other identifying information of the network devices. For example, from among the network devices advertising the same highest leader priority, the elected leader may be the network device with the numerically highest system identifier, internet protocol address, router identifier, etc.

In Step 302, the area leader generates an area representation node identifier. In one or more embodiments of the invention, an area representation node identifier may be any information that identifies an area representation node that will be used as an abstraction of a first area of a network topology. For example, an area representation node identifier may be a number represented by a series of binary (i.e., 1 or 0) bits that may be included in a type-length-value (TLV) encoded portion of a first area LSP.

In Step 304, the area leader distributes the area representation node identifier to any number of area edge devices. In one or more embodiments of the invention, the area representation node identifier is distributed as part of a first area LSP to first area devices that are adjacent to the area leader. Because the first area devices implement a link state routing protocol such as, for example IS-IS, they store the area representation node identifier in a first area link state database, and re-distribute the first area LSP that includes the area representation node identifier to adjacent first area devices other than that from which the LSP was received. Thus, each device in the first area ultimately receives the LSP, and stores the area representation node identifier in their respective first area link state databases. Because the area edge devices also participate in the first area, they necessarily also receive the LSP and store the area representation node identifier in a first area link state database. Said another way, the area edge devices may receive the LSP with the area representation node identifier either directly from the area leader if they happen to be first area adjacent to the area leader, or indirectly as members of the first area link state routing protocol scheme. Thus, the area leader may be considered to advertise the existence of the area representation node identifier to the area edge devices by way of a first area LSP that includes the area representation node identifier.

In Step 306, based on an identification of the existence of an area representation node identifier in a first area link state database, each area edge device constructs a second area LSP to be distributed to the area leader, to which, as discussed above, the area edge devices have either a direct or tunneled connection. In one or more embodiments of the invention, the second area LSP includes an area edge device's adjacencies to any second area devices and to the area leader, as well as the area representation node identifier previously received from the area leader (see Step 304, above). Each area edge device then transmits its respective second area LSP to the area leader.

In Step 308, the area leader uses the second area LSPs received from the various area edge devices to generate an area representation node LSP. In one or more embodiments of the invention, the area representation node LSP is generated by constructing an LSP that includes the area representation node identifier and all the second area device adjacencies of the various area edge devices. Accordingly, the area representation node LSP may represent all of the adjacencies of the first area to devices in the second area.

In Step 310, the area representation node LSP generated in Step 308 is distributed to second area devices. In one or more embodiments of the invention, the area representation node LSP is distributed using any distribution scheme of any link state routing protocol. For example, the area representation node LSP may be flooded throughout the second area via successive distributions to second area adjacent neighbors, beginning with the area leader. Each second area device that receives the area representation node LSP may then store the information therein in respective second area link state databases. The second area devices may then advertise an adjacency to the area representation node rather than any specific one or more area edge devices. Accordingly, any network traffic data unit received by a second area device that is destined for a device reachable through the network topology may be routed through the area representation node (i.e., the abstracted first area). For example, a network traffic data unit may be received by a second area device, and then routed to an area edge device. The area edge device may then use segment routing to route the network traffic data unit through the first area to another area edge device, from which the network traffic data unit may be further routed towards its final destination.

In Step 312, a determination is made whether the area leader has failed. In one or more embodiments of the invention, the area leader may be determined to have failed using any scheme for determining that a network device has failed. For example, the area leader may be determined to have failed by any one or more other devices in a network topology that stop receiving some form of expected communication (e.g., periodic packets) from the area leader. In one or more embodiments of the invention, there must be an area leader to generate and distribute the area representation node LSP. If the area leader has failed, the process proceeds to Step 314. If the area leader has not failed, then the process ends. Although the basic process is shown to end in FIG. 3 if the area leader has not failed, one having ordinary skill in the relevant art will appreciate that the process may actually continue while the network topology exists and is configured to implement one or more embodiments of the invention. Accordingly the area leader may continue to periodically receive second area LSPs from the area edge devices, generate the area representation node LSP, and distribute the area representation node LSP to the second area devices unless, at some point, the area leader is determined to have failed.

If, in Step 312, the area leader is determined to have failed, then, in Step 314, a new area leader is elected. In one or more embodiments of the invention, the election of the new area leader may be substantially similar to the election of the area leader discussed above in the description of Step 300. In one or more embodiments of the invention, once the new area leader has been elected, the process returns to Step 308, and the area representation node LSP is generated and distributed to second area devices. Although not shown in FIG. 3, if in Step 312, the area leader is determined to have failed, then the process may alternatively return to Step 302 to begin the process of generating an area representation node LSP.

Figure 4:
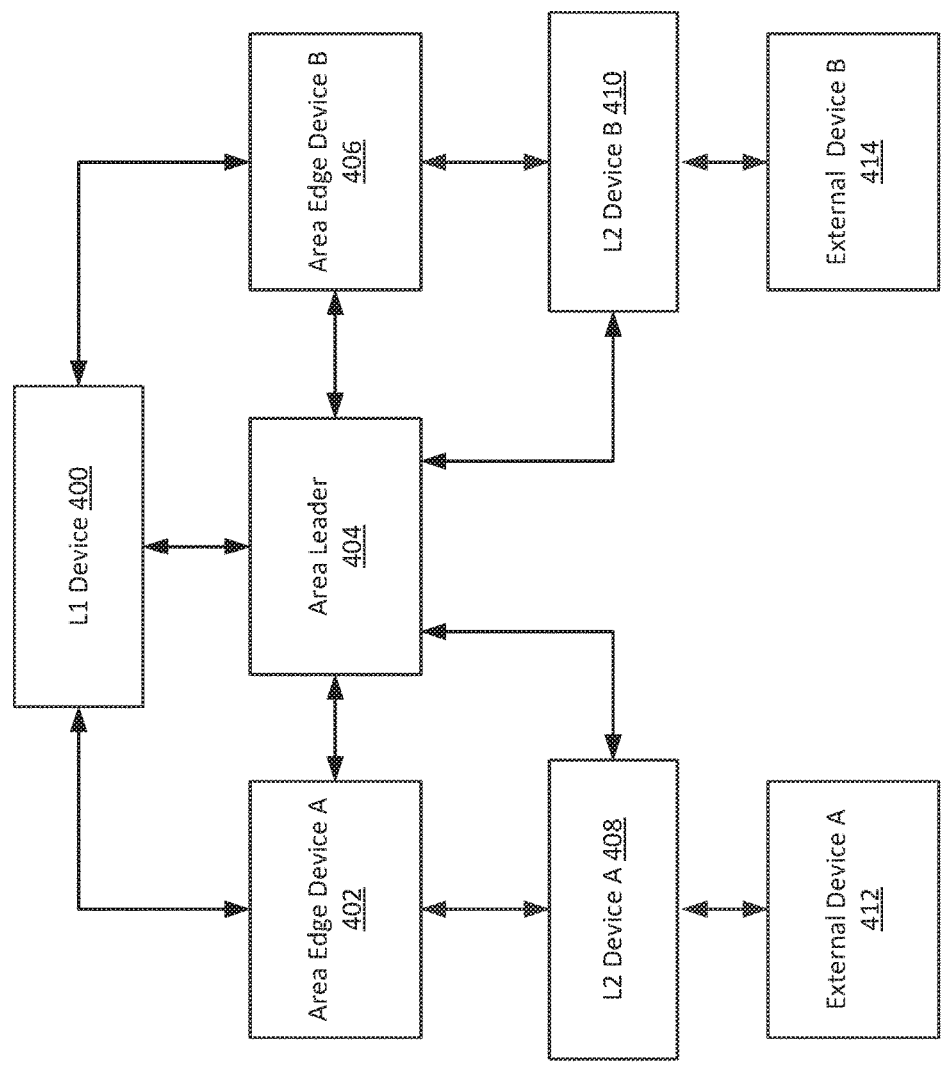
FIG. 4 shows an example in accordance with one or more embodiments of the invention.

FIG. 4 shows an example in accordance with one or more embodiments of the invention. The following example is for explanatory purposes only and not intended to limit the scope of the invention.

Referring to FIG. 4, consider a scenario in which a spine leaf network topology is configured to implement an IS-IS link state routing protocol. As such, spine devices are included in a L1 area, leaf devices are included in a L2 area, and some devices participate in both L1 and L2, and, as such, are referred to as area edge devices.

In such a scenario, the network topology includes at least one L1 device (400), an elected area leader (404), at least two area edge devices (402, 406), and at least two L2 devices (408). The L1 device (400) is directly or indirectly connected and in communication with other L1 devices (not shown) and to devices that participate in both L1 and L2. As such, the L1 device (400) is operatively connected to at least the area edge devices (402, 406) and a previously elected area leader (404).

As shown in FIG. 4, the connection between the area leader (404) and each of the area edge devices (402, 406) represents both an operative (i.e., direct or indirect) L1 connection, and either a direct or tunneled L2 adjacency connection. Area edge device A (402) is L2 adjacent and connected to L2 device A (408). Area edge device B (406) is L2 adjacent and connected to L2 device B (410). L2 device A (408) is operatively connected to external device A (412). L2 device B (410) is operatively connected to external device B (414).

In this scenario, as the elected area leader, the area leader (404) has generated an area representation node identifier, TLV encoded the area representation node identifier, included the TLV encoding into a L1 LSP, and distributed the L1 LSP to adjacent L1 devices, such that the L1 LSP is ultimately flooded throughout the L1 area, including to the area edge devices (402, 406), which store the area representation node identifier in their respective L1 link state databases.

The area edge devices (402, 406) identify the area representation node identifier in their L1 link state database, and respond by generating a L2 LSP. The L2 LSP for area edge device A (402) includes the area representation node identifier and at least the adjacency information showing adjacency to the area leader (404) and L2 device A (408). The L2 LSP for area edge device B (404) includes the area representation node identifier and at least the adjacency information showing adjacency to the area leader (404) and L2 device B (410).

Using the two L2 LSPs received from the area edge devices (402, 406), the area leader (404) then generates an area representation node LSP. The area representation node LSP includes the area representation node identifier and information indicating an adjacency to both L2 device A (408) and L2 device B (410). The area representation node LSP is then distributed as an L2 LSP to all L2 devices (e.g., 408, 410), which include the information therein in their respective L2 link state databases rather than information related to the entire spine-leaf network topology. The L2 devices may then advertise their adjacency to the area representation node for the purposes of routing network traffic data units through the spine-leaf network topology.

In this scenario, a network traffic data unit is received at L2 device A (408) from external device A (412). The network traffic data unit is destined for external device B (414) as the final destination. As an example, the network traffic data unit may be a hypertext transfer protocol (HTTP) request from a mobile device (i.e., external device A (412)) intended for a web server (i.e., external device B (414)) and packaged in an IP packet within a MAC frame.

L2 device A (408) receives the network traffic data unit based on its adjacency to the area representation node, which is, in turn, adjacent to L2 device B (410). In other words, the area representation node (i.e., the abstracted L1 area) is a necessary intermediate step along the path to external device B (414) (i.e., the destination of the network traffic data unit).

In order to get the network traffic data unit from L2 device A (408) to L2 device B (410), L2 device A (408) first transmits the network traffic data unit to area edge device A (402). Area edge device A (402) then adds a label stack to the network traffic data unit, with each label in the stack intended to direct the network traffic data unit along a pre-determined path to L2 device B (410). In the simple example shown in FIG. 4, the label stack includes two labels to send the network traffic data unit along a path that includes the L1 device (400) and area edge device B (406), each of which pop off their respective label before transmitting the network traffic data unit along the path to L2 device B. Thus, L2 device B receives the network traffic data unit without the label stack, and routes it appropriately towards external device B.

Embodiments of the invention described above allow for a first area to be abstracted when included in a link state database of a second area. This abstraction may significantly reduce the storage burden within the second area link state database. This reduction is realized via not having to include all link state information for the first area topology in the second area links state database in order to route second area network traffic through the first area.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for routing protocol area abstraction, the method comprising:
   electing an area leader from among a plurality of network devices in a network comprising a first area and second area;
   generating, by the area leader, an area representation node identifier associated with the first area of the network, the first area comprising a plurality of first area network devices, a plurality of area edge devices, and the area leader, wherein the area representation node identifier identifies an area representation node used to represent the first area;
   distributing, by the area leader, the area representation node identifier to the plurality of area edge devices, wherein distributing the area representation node identifier to the plurality of area edge devices triggers each area edge device of the plurality of area edge devices to determine a portion of a plurality of second area devices to which they are adjacent;
   receiving, by the area leader and from the plurality of area edge devices, a plurality of second area link state packets (LSPs) in response to the distribution of the area representation node identifier, wherein each of the plurality of second area LSPs comprise the area representation node identifier and the portion of the plurality of second area devices to which each area edge device of the plurality of area edge devices is adjacent;
   generating, by the area leader and using the plurality of second area LSPs, an area representation node LSP comprising the area representation node identifier and a plurality of area neighbor adjacencies between the plurality of area edge devices and the plurality of second area devices; and
   distributing, by the area leader, the area representation node LSP to each of the plurality of second area network devices in the second area of the network, wherein, in response to receiving a copy of the area representation node LSP, each of the plurality of second area network devices advertise an adjacency to the area representation node to a plurality of other second area devices.

2. The method of claim 1, wherein the area leader and each of the plurality of area edge devices are operatively connected to both the first area and the second area of the network.

3. The method of claim 1, wherein distributing the area representation node identifier to the plurality of area edge devices comprises transmitting a first area LSP comprising an encoding of the area representation node identifier to an area edge device of the plurality of area edge devices.

4. The method of claim 1, further comprising, before receiving the plurality of second area LSPs by the area leader:

identifying, by an area edge device of the plurality of area edge devices, the area representation node identifier in a first area database;

generating, by the area edge device, a second area LSP of the plurality of second area LSPs, the second area LSP comprising an area edge device neighbor adjacency and an area leader adjacency; and transmitting the second area LSP from the area edge device to the area leader.

5. The method of claim 4, wherein the area edge device neighbor adjacency identifies a second area neighbor device adjacent to the area edge device.

6. The method of claim 1, further comprising, after distributing the area representation node LSP:

receiving, from a first network device of the plurality of second area network devices in the second area, at a first area edge device of the plurality of area edge devices, a network traffic data unit destined for a second network device of the plurality of second area network devices in the second area, based on an advertisement by the first network device of the adjacency to the area representation node; and routing the network traffic data unit from the first area edge device to the second network device using segment routing.

7. The method of claim 1, further comprising, after distributing the area representation node LSP:

identifying that the area leader has failed;

electing a new area leader;

re-generating, by the new area leader, the area representation node LSP; and distributing, by the new area leader, the area representation node LSP to the plurality of second area network devices in the second area of the network.

8. A non-transitory computer readable medium comprising instructions that, when executed by a processor, perform a method for routing protocol area abstraction, the method comprising:

electing an area leader from among a plurality of network devices in a network comprising a first area and second area;

generating, by the area leader, an area representation node identifier associated with the first area of the network, the first area comprising a plurality of first area network devices, a plurality of area edge devices, and the area leader, wherein the area representation node identifier identifies an area representation node used to represent the first area;

distributing, by the area leader, the area representation node identifier to the plurality of area edge devices, wherein distributing the area representation node identifier to the plurality of area edge devices triggers each area edge device of the plurality of area edge devices to determine a portion of a plurality of second area devices to which they are adjacent;

receiving, by the area leader and from the plurality of area edge devices, a plurality of second area link state packets (LSPs) in response to the distribution of the area representation node identifier, wherein each of the plurality of second area LSPs comprise the area representation node identifier and the portion of the plurality of second area devices to which each area edge device of the plurality of area edge devices is adjacent;

generating, by the area leader and using the plurality of second area LSPs, an area representation node LSP comprising the area representation node identifier and a plurality of area neighbor adjacencies between the plurality of area edge devices and the plurality of second area devices; and distributing, by the area leader, the area representation node LSP to each of the plurality of second area network devices in the second area of the network, wherein, in response to receiving a copy of the area representation node LSP, each of the plurality of second area network devices advertise an adjacency to the area representation node to a plurality of other second area devices.

9. The non-transitory computer readable medium of claim 8, wherein the area leader and each of the plurality of area edge devices are operatively connected to both the first area and the second area of the network.

10. The non-transitory computer readable medium of claim 8, wherein distributing the area representation node identifier to the plurality of area edge devices comprises transmitting a first area LSP comprising an encoding of the area representation node identifier to an area edge device of the plurality of area edge devices.

11. The non-transitory computer readable medium of claim 8, wherein the method further comprises, before receiving the plurality of second area LSPs by the area leader:

identifying, by an area edge device of the plurality of area edge devices, the area representation node identifier in a first area database;

generating, by the area edge device, a second area LSP of the plurality of second area LSPs, the second area LSP comprising an area edge device neighbor adjacency and an area leader adjacency; and transmitting the second area LSP from the area edge device to the area leader.

12. The non-transitory computer readable medium of claim 11, wherein the area edge device neighbor adjacency identifies a second area neighbor device adjacent to the area edge device.

13. The non-transitory computer readable medium of claim 8, wherein the method further comprises, after distributing the area representation node LSP:

receiving, from a first network device of the plurality of second area network devices in the second area, at a first area edge device of the plurality of area edge devices, a network traffic data unit destined for a second network device of the plurality of second area network devices in the second area, based on an advertisement by the first network device of the adjacency to the area representation node; and routing the network traffic data unit from the first area edge device to the second network device using segment routing.

14. The non-transitory computer readable medium of claim 8, wherein the method further comprises, after distributing the area representation node LSP:

identifying that the area leader has failed;

electing a new area leader;

re-generating, by the new area leader, the area representation node LSP; and distributing, by the new area leader, the area representation node LSP to the plurality of network devices in the second area of the network.

15. A system for routing protocol area abstraction, the system comprising:

an elected area leader comprising a processor, a memory, and a storage device, and operatively connected to a plurality of area edge devices, a plurality of first area network devices of a first area of a network also comprising the plurality of area edge devices, and the area leader, and a plurality of second area network devices of a second area of the network also comprising the plurality of area edge devices, and the area leader, wherein the elected area leader is configured to:

generate an area representation node identifier associated with the first area of the network, wherein the area representation node identifier identifies an area representation node used to represent the first area;

distribute the area representation node identifier to the plurality of area edge devices, wherein the distribution of the area representation node identifier to the plurality of area edge devices trig ers each area edge device of the plurality of area edge devices to determine a portion of a plurality of second area devices to which they are adjacent;

receive, from the plurality of area edge devices, a plurality of second area link state packets (LSPs) in response to the distribution of the area representation node identifier, wherein each of the plurality of second area LSPs comprise the area representation node identifier and the portion of the plurality of second area devices to which each area edge device of the plurality of area edge devices is adjacent;

generate, using the plurality of second area LSPs, an area representation node LSP comprising the area representation node identifier and a plurality of area neighbor adjacencies between the plurality of area edge devices and the plurality of second area devices; and distribute the area representation node LSP to each of the plurality of second area network devices, wherein, in response to receiving a copy of the area representation node LSP, each of the plurality second area of network devices advertise an adjacency to the area representation node to a plurality of other second area devices.

16. The system of claim 15, wherein the elected area leader is operatively connected to each of the plurality of area edge devices by a direct connection or a tunnel connection.

17. The system of claim 15, wherein, to distribute the area representation node identifier to the plurality of area edge devices, the elected area leader is further configured to transmit a first area LSP comprising an encoding of the area representation node identifier to an area edge device of the plurality of area edge devices.

18. The system of claim 15, wherein an area edge device of the plurality of area edge devices is configured to, before the receipt the plurality of second area LSPs by the elected area leader:

identify the area representation node identifier in a first area database;

generate a second area LSP of the plurality of second area LSPs, the second area LSP comprising an area edge device neighbor adjacency and an area leader adjacency; and transmit the second area LSP from the area edge device to the elected area leader.

19. The system of claim 18, wherein the area edge device neighbor adjacency identifies a second area neighbor device adjacent to the area edge device.

20. The system of claim 15, wherein the first area of the network comprises a spine layer of the network and the second area comprises a leaf layer of the network.

* * * * *